(12) United States Patent
Cadix et al.

(10) Patent No.: US 10,323,175 B2
(45) Date of Patent: Jun. 18, 2019

(54) FRACTURING FLUIDS BASED ON ASSOCIATIVE POLYMERS AND ON LABILE SURFACTANTS

(71) Applicant: RHODIA OPERATIONS, Paris (FR)

(72) Inventors: Arnaud Cadix, Saint Ouen (FR); James Wilson, Coye la Foret (FR)

(73) Assignee: RHODIA OPERATIONS, Paris (FR)

( * ) Notice: Subject to any disclaimer, the term of this patent is extended or adjusted under 35 U.S.C. 154(b) by 95 days.

(21) Appl. No.: 14/783,727

(22) PCT Filed: Apr. 10, 2014

(86) PCT No.: PCT/EP2014/057275
§ 371 (c)(1),
(2) Date: Oct. 9, 2015

(87) PCT Pub. No.: WO2014/167056
PCT Pub. Date: Oct. 16, 2014

(65) Prior Publication Data
US 2016/0298023 A1    Oct. 13, 2016

(30) Foreign Application Priority Data

Apr. 11, 2013 (FR) ..................... 13 00864

(51) Int. Cl.
| | | |
|---|---|---|
| C09K 8/60 | (2006.01) | |
| C09K 8/88 | (2006.01) | |
| E21B 43/26 | (2006.01) | |
| C09K 8/68 | (2006.01) | |

(52) U.S. Cl.
CPC ............. *C09K 8/602* (2013.01); *C09K 8/68* (2013.01); *C09K 8/88* (2013.01); *C09K 8/882* (2013.01); *E21B 43/26* (2013.01)

(58) Field of Classification Search
None
See application file for complete search history.

(56) References Cited

U.S. PATENT DOCUMENTS

| | | |
|---|---|---|
| 4,432,881 A | 2/1984 | Evani |
| 4,529,523 A | 7/1985 | Landoll |
| 4,638,865 A | 1/1987 | Ball et al. |
| 4,702,319 A | 10/1987 | Bock et al. |
| 4,709,759 A | 12/1987 | Bock et al. |
| 4,780,517 A | 10/1988 | Ching |
| 4,814,096 A | 3/1989 | Evani |
| 4,852,652 A | 8/1989 | Kuehne |
| 4,861,499 A | 8/1989 | Neff et al. |
| 6,153,705 A | 11/2000 | Corpart et al. |
| 6,545,098 B1 | 4/2003 | Bouhadir et al. |
| 6,777,513 B1 | 8/2004 | Destarac et al. |
| 6,812,291 B1 | 11/2004 | Corpart et al. |
| 2003/0045661 A1 | 3/2003 | Destarac et al. |
| 2005/0065038 A1 | 3/2005 | Weaver et al. |
| 2005/0107503 A1* | 5/2005 | Couillet .............. C09K 8/62 524/249 |
| 2010/0047203 A1* | 2/2010 | Dieckmann ........... A01N 25/30 424/78.18 |
| 2010/0120637 A1* | 5/2010 | Bendejacq ......... C08F 293/005 507/219 |
| 2012/0135895 A1 | 5/2012 | Eoff |

FOREIGN PATENT DOCUMENTS

| | | |
|---|---|---|
| FR | 2794464 A1 | 12/2000 |
| GB | 2383355 A | 6/2003 |
| WO | 85/03510 A1 | 8/1985 |
| WO | 96/30421 A1 | 10/1996 |
| WO | 98/01478 A1 | 1/1998 |
| WO | 98/58974 A1 | 12/1998 |
| WO | 99/31144 A1 | 6/1999 |
| WO | 99/35177 A1 | 7/1999 |
| WO | 99/35178 A1 | 7/1999 |
| WO | 00/75207 A1 | 12/2000 |
| WO | 01/42312 A1 | 6/2001 |
| WO | 02/26836 A2 | 4/2002 |
| WO | 2014167059 A1 | 10/2014 |

OTHER PUBLICATIONS

Tehrani-Bagha, Alireza, et al—"Cleavable surfactants", 2007, Colloid & Interface Science, vol. 12, Elsevier, pp. 81-91; 11 pgs.
Lacik, Igor, et al—"Compositional heterogeneity effects in hydrophobically associating water-soluable polymers prepared by micellar copolymerization" 1995, Polymer, vol. 36, Issue No. 16, Elsevier, pp. 3197-3211; 15 pgs.
Najafi, F., et al—"Synthesis and Characterization of a Nonionic Urethane-Based Thickener", 2011, Progress in Color, Colorants & Coatings, vol. 4, Ministry of Science, Research and Technology, Institute for Color Science and Technology, pp. 71-77; 7 pgs.
Magny, B., et al—"Interactions between hydrophobically modified polymers and surfactants", 1992, Progress in Colloid & Polymer Science, vol. 89, pp. 118-121; 4 pgs.

* cited by examiner

*Primary Examiner* — Jeffrey D Washville

(57) ABSTRACT

The present invention relates to a fracturing fluid comprising, in an aqueous medium:
 an associative polymer; and
 a labile surfactant, in an amount sufficient to reduce or inhibit the effect of increasing the viscosity induced by said associative polymer.

7 Claims, No Drawings

FRACTURING FLUIDS BASED ON ASSOCIATIVE POLYMERS AND ON LABILE SURFACTANTS

This application is a U.S. national stage entry under 35 U.S.C. § 371 of International Patent Application No. PCT/EP2014/057275, filed Apr. 10, 2014, which claims priority to French Patent Application No. 13/00864, filed on Apr. 11, 2013, and the whole content of each of these applications is hereby incorporated herein by reference for all purposes.

The present invention relates to the field of fracturing techniques used within the context of oil extraction.

Hydraulic fracturing is a technique commonly used in the field of the recovery of oil and gas in hydrocarbon reservoirs, the purpose of which is to create fractures within the reservoir in order to increase the interfaces for exchanges between the extraction fluids and the hydrocarbons contained in the reservoir.

Fracturing generally uses a high-pressure injection of aqueous fracturing fluids comprising polymers that give the fluid a high viscosity. The injection of these fluids within hydrocarbon reservoirs (the term hydrocarbon reservoir includes, within the meaning of the present description, in particular reservoir rocks) in general involves the use of considerable pressures which, on the one hand, involve energy expenditures in terms of pumping and, on the other hand, may degrade the polymers under the effect of the shear. Indeed, typically, a fracturing fluid is injected from the surface to within a hydrocarbon reservoir over distances of the order of several thousands of meters.

One objective of the present invention is to provide fracturing fluids based on viscosifying polymers which have an effectiveness similar to known fluids, but which are more easily injectable, making it possible, inter alia, to reduce the energy necessary for their injection, and for which the degradation phenomena of the viscosifying polymers under shear are preferably reduced or even zero.

For this purpose, a novel type of fracturing fluid is proposed according to the present invention, which comprises, in an aqueous medium:
  (i) associative polymers, which are intrinsically suitable for increasing the viscosity of the aqueous medium, or even for gelling it; and
  (ii) at least one labile surfactant present in an amount sufficient to reduce or inhibit the effect of increasing the viscosity induced by said associative polymers during the injection and which is degraded after the injection under the temperature and pH conditions of the hydrocarbon reservoir into which it is introduced whereby the viscosity of the fluid increases after injection.

More specifically, according to a first aspect, one subject of the present invention is a fracturing fluid comprising, in an aqueous medium:
  an associative polymer; and
  a labile surfactant, in an amount sufficient to reduce or inhibit the effect of increasing the viscosity induced by said associative polymer.

According to another aspect, the invention relates to the use of the aforementioned fluids as fracturing fluid. Within this context, one subject of the invention is in particular a process for recovery of hydrocarbons in a hydrocarbon reservoir, comprising a step where a fracturing fluid of the aforementioned type is injected into a hydrocarbon reservoir where the temperature and/or pH conditions are suitable for lyzing all or some of the labile surfactant.

The expression "associative polymer" is understood, within the meaning of the present description, to be a polymer suitable for increasing the viscosity of an aqueous medium by associations that involve hydrophobic-hydrophobic interactions between the polymers. Such polymers are also sometimes denoted by the name "hydrophobically associative water-soluble polymers"(HAPs) or else "amphiphilic polymers". These are, in general, polymers comprising a backbone of hydrophilic nature and that include, along the chains and/or at all or some of the ends thereof, small amounts (typically of the order of 0.001 mol % to 10 mol %, and generally a few molar percent at the very most) of functions of hydrophobic nature. When such polymers are placed in an aqueous medium, they form, in a manner known per se, hydrophobic connections (the hydrophobic functions group together in order to reduce the energy of the system, in the same way as surfactant micelles are formed in an aqueous medium).

Furthermore, the concept of "labile surfactant"(or "cleavable surfactant") here denotes a surfactant which is suitable for being lyzed, typically by being cleaved into two separate molecules, under pH and temperature conditions where at least one portion of the associative polymers with which it is associated in the composition is not degraded. The cleavable surfactants used according to the invention are surfactants which degrade after injection, under conditions where the associative polymers are not degraded. Labile surfactants of this type are well known in the literature. For further details, reference may especially be made to "*Cleavable surfactants*" Alireza Tehrani-Bagha, Krister Holm.

The specific use of a labile surfactant gives the fracturing fluid according to the invention the advantages of the known fracturing fluids while being free of their drawbacks. Indeed, owing to the presence of this labile surfactant, the fracturing fluid has, when it is injected, a reduced viscosity which facilitates its injection, and the viscosity is re-established in the zone where it is desired to carry out the fracturing.

The lowering of the viscosity obtained owing to the presence of the labile surfactant makes it possible to substantially reduce the pressure loss phenomena and, in the case where polymers sensitive to degradation are used, enables a reduction in the degradation of the polymers under shear.

Furthermore, the nature of the associative polymers present in the fracturing fluids of the present invention is highly adjustable.

In particular, according to one advantageous embodiment, the fracturing fluids of the invention may advantageously comprise, as associative polymers, amphiphilic polymers of relatively low molecular weight (for example less than 1 000 000 g/mol, or even less than 500 000 g/mol, for example less than 100 000 g/mol) that make it possible to induce high viscosities after lysis of the labile surfactant, and this starting from relatively low concentrations, and which are in addition less sensitive to shear degradation than polymers of larger size.

In practice, virtually all associative polymers may be used according to the invention. On this subject, it should be noted that, in addition to the aforementioned advantages, the labile surfactant present in the compositions of the invention makes it possible to improve the hydration of the polymers in an aqueous medium, which makes it possible to use any type of associative polymer, including those that are reputedly the least hydratable, in the compositions of the invention. The invention thus opens the way to use of numerous amphiphilic polymers in fracturing liquids.

Considering the large range of polymers and surfactants that can be used within the context of the invention, the fracturing method described here is extremely adjustable.

By making a suitable choice of polymer and of surfactant, it is possible to provide, according to the invention, both fracturing fluids for which a high viscosity will be recovered after a few meters only and fluids for which the viscosity remains low up to the fracturing zone.

It is possible to finely adjust the behavior of the fracturing fluid in order to adapt the change in its viscosity along the injection zone. As a function of the polymer and surfactant used, it is within the abilities of a person skilled in the art to adapt the concentrations of the two compounds in order to obtain the desired viscosity change profile. Before the lysis of the labile surfactants, the associative polymers and the surfactants interact according to a known mechanism, described in particular in "*Interactions between hydrophobically modified polymers and surfactants*" B. Magny, I. Iliopoulos, R. Audebert, L. Piculell, B. Lindman Progress in *Colloid & Polymer Science* Volume 89, 1992, pp. 118-121.

The interactions between associative polymers and surfactants vary in a manner known per se as a function of the surfactant content. When a very small amount of surfactant is added, this small amount of surfactant densifies the number of hydrophobic bonds, which increases the viscosity. At a low surfactant content, the viscosity thus increases up to a maximum as the surfactant is added. Beyond the limit content of surfactant for which this maximum is observed, the tendency reverses and the addition of surfactant on the contrary makes the interactions between the polymers, and therefore the viscosity, decrease more and more. For any surfactant and polymer pair, there is a minimum surfactant concentration beyond which a systematic decrease in the viscosity is obtained, this minimum concentration being very easy to determine.

According to one embodiment, the surfactant and the polymer and also the respective concentrations thereof are chosen so that a low viscosity is maintained from the surface to the zone where it is desired to carry out the fracturing and the rise in viscosity due to the lysis of the surfactant preferably takes place just before penetration in the fracturing zone.

In addition to the aforementioned advantages, the associative polymers used within the context of the present invention in general induce rheological properties of the fracturing fluid that make it suitable for ensuring an effective control of the fracturing.

The particular rheology of the fracturing fluids of the invention are in addition generally very well suited to effectively transporting proppants in suspension. These proppants are particles intended to consolidate and keep the fractures open by sliding therein during their formation (they are typically graded sand).

Furthermore, the associative polymers used in the fracturing fluids of the invention have the advantage of being able to be used in the presence of salts (the presence of salts furthermore generally improves their associative nature), which allows the use of the water immediately available in the environment close to the extraction zone without having to worry about its purity or its salt content. The associative polymers of the invention in this way constitute an advantageous alternative to the polymers usually used in fracturing of the polysaccharide type (such as borate- or zirconate-crosslinked guars, for which the quality of the water used is a determining factor). Thus, in particular, the invention lends itself well to the formulation of fracturing fluids based on seawater or on production water and more generally on any water that may contain salts (including at high contents that may range up to 25% by weight and/or with high hardnesses that may range up to $Mg^{2+}$ and $Ca^{2+}$ contents of the order of 5000 ppm): according to one particular embodiment, the fracturing fluid of the invention comprises seawater or production water as the aqueous medium.

Various more particular features and embodiments of the invention will now be described in greater detail.

The Associative Polymers:

The polymers used according to the invention may vary to quite a large extent.

They may, for example, be selected from the polymers described in U.S. Pat. Nos. 4,529,523, 4,432,881, 4,814,096, WO 85/03510, U.S. Pat. Nos. 4,702,319, 4,709,759, 4,638,865, 4,780,517, 4,852,652 or 4,861,499.

More generally, they may be associative polymers based on a hydrophilic backbone bearing hydrophobic groups of the type obtained by synthesis pathways of HASE type (direct synthesis pathway) or of HEUR type (post-addition of hydrophobic groups to a hydrophilic chain). Examples of this type of synthesis are in particular described in *Prog. Color Colorants Coat*. Vol 4, pp. 71-77 (2011).

Use may furthermore be made of associative polymers resulting from micellar radical polymerization processes of the type described in U.S. Pat. No. 4,432,881 or else in *Polymer*, vol. 36, No. 16, pp. 3197-3211 (1996), to which reference may be made for further details, by copolymerization of hydrophilic monomers and hydrophobic monomers within an aqueous dispersant medium (typically water or a water/alcohol mixture) which comprises:

hydrophilic monomers in the dissolved or dispersed state in said medium; and hydrophobic monomers in surfactant micelles formed in said medium by introducing therein this surfactant at a concentration above its critical micelle concentration (cmc).

According to one particular embodiment, the hydrophobic monomers present in surfactant micelles used in micellar polymerization may be monomers which, by themselves, have the property of forming micelles without needing to add additional surfactants (monomers referred to as being "self-micellizable" in the rest of the description). According to this particular embodiment, the surfactant used may be the self-micellizable hydrophobic monomer itself, used without other surfactant, although the presence of such an additional surfactant is not excluded. Thus, for the purposes of the present description, when mention is made of hydrophobic monomers in surfactant micelles, this notion encompasses both (i) hydrophobic monomers present in surfactant micelles other than these monomers, and (ii) monomers comprising at least one hydrophobic part or block and forming by themselves the micelles in aqueous medium. The two aforementioned embodiments (i) and (ii) are compatible and may coexist (hydrophobic monomers in micelles formed by another self-micellizable monomer for example, or else micelles comprising a combination of surfactants and self-micellizable monomers).

In micellar polymerization, the hydrophobic monomers contained in the micelles are said to be in "micellar solution". The micellar solution to which reference is made is a micro-heterogeneous system that is generally isotropic, optically transparent and thermodynamically stable.

According to one advantageous embodiment, the associative polymers used according to the present invention are polymers obtained according to a process that comprises a step (E) of micellar radical polymerization in which the following are placed in contact, in an aqueous medium (M):

hydrophilic monomers, dissolved or dispersed in said aqueous medium (M);

hydrophobic monomers in the form of a micellar solution, namely containing, in the dispersed state within the medium (M), micelles comprising these hydrophobic monomers (it being possible in particular for this dispersed state to be obtained using at least one surfactant);

at least one radical polymerization initiator, this initiator typically being water-soluble or water-dispersible; and at least one radical polymerization control agent.

The aqueous medium (M) used in step (E) is a medium comprising water, preferably in a proportion of at least 50% by mass, or even at least 80%, for example at least 90%, or even at least 95%. This aqueous medium may optionally comprise solvents other than water, for example a water-miscible alcohol. Thus, the medium (M) may be, for example, an aqueous-alcoholic mixture. According to one possible variant, the medium (M) may comprise other solvents, preferably in a concentration in which said solvent is water-miscible, which may especially make it possible to reduce the amount of stabilizing surfactants used. Thus, for example, the medium (M) may comprise pentanol, or any other additive for adjusting the aggregation number of the surfactants. In general, it is preferable for the medium (M) to be a continuous phase of water consisting of one or more solvents and/or additives that are miscible with each other and in water in the concentrations at which they are used.

For the purposes of the present description, the term "radical polymerization control agent" means a compound that is capable of extending the lifetime of the growing polymer chains in a polymerization reaction and of giving the polymerization a living or controlled nature. This control agent is typically a reversible transfer agent as used in controlled radical polymerizations denoted by the terminology RAFT or MADIX, which typically use a reversible addition-fragmentation transfer process, such as those described for example in WO 96/30421, WO 98/01478, WO 99/35178, WO 98/58974, WO 00/75207, WO 01/42312, WO 99/35177, WO 99/31144, FR 2794464 or WO 02/26836.

According to one advantageous embodiment, the radical polymerization control agent used in step (E) is a compound which comprises a thiocarbonylthio group —S(C=S)—. Thus, for example, it may be a compound which comprises a xanthate group (bearing —SC=S—O— functions), for example a xanthate. A suitable xanthate is Rhodixan A1 available from Solvay. Other types of control agent may be envisioned (for example of the type used in CRP or ATRP).

According to one particular embodiment, the control agent used in step (E) may be a polymer chain derived from a controlled radical polymerization and bearing a group that is capable of controlling a radical polymerization (polymer chain of "living" type, which is a type that is well known per se). Thus, for example, the control agent may be a polymer chain (preferably hydrophilic or water-dispersible) functionalized at the chain end with a xanthate group or more generally comprising a group —SC=S—, for example obtained according to the MADIX technology.

Alternatively, the control agent used in step (E) is a non-polymeric compound bearing a group that ensures the control of the radical polymerization, especially a thiocarbonylthio group —S(C=S)—.

According to one particular variant, the radical polymerization control agent used in step (E) is a polymer, advantageously an oligomer, of water-soluble or water-dispersible nature and bearing a thiocarbonylthio group —S(C=S)—, for example a xanthate group —SC=S—O—. This polymer, which is capable of acting both as a polymerization control agent and as a monomer in step (E), is also referred to as a "prepolymer" in the rest of the description. Typically, this prepolymer is obtained by radical polymerization of hydrophilic monomers in the presence of a control agent bearing a thiocarbonylthio group —S(C=S)—, for example a xanthate. Thus, for example, according to one advantageous embodiment which is illustrated at the end of the present description, the control agent used in step (E) may advantageously be a prepolymer bearing a thiocarbonylthio group —S(C=S)—, for example a xanthate group —SC=S—O—, obtained at the end of a step)($E^0$) of controlled radical polymerization prior to step (E). In this step)($E^0$), the following may typically be placed in contact: hydrophilic monomers, advantageously identical to those used in step (E); a radical polymerization initiator; and a control agent bearing a thiocarbonylthio group —S(C=S)—, for example a xanthate.

The use of the abovementioned step)($E^0$) prior to step (E) makes it possible, schematically, to hydrophilize a large number of control agents bearing thiocarbonylthio functions (for example xanthates, which are rather hydrophobic by nature), by converting them from prepolymers that are soluble or dispersible in the medium (M) of step (E). Preferably, a prepolymer synthesized in step)($E^0$) has a short polymer chain, for example comprising a sequence of less than 50 or less than 25 monomer units, for example between 2 and 15 monomer units.

Unexpectedly, it turns out that the conditions of step (E) make it possible to combine the advantages both of controlled radical polymerization and of micellar polymerization. Within this context, the inventors have in particular now demonstrated that the presence of micelles in the polymerization medium does not affect the action of the control agents, which make it possible to perform a controlled polymerization of the monomers present in the aqueous medium in a similar manner to a controlled radical polymerization performed in homogeneous medium, thus making it possible very readily to predict and control the average molar mass of the synthesized polymer (this mass is proportionately higher the lower the initial concentration of control agent in the medium, this concentration dictating the number of growing polymer chains). At the same time, the presence of the control agent is not detrimental either to the advantageous effect observed in polymerization, namely the precise control of the size of the hydrophobic blocks.

In addition to this control of the polymerization of the monomers, not obtained in the more usual micellar polymerization processes, the use of step (E) of the process of the invention in addition makes it possible, also completely surprisingly, to attain polymers having both a large and controlled size, which proves very particularly unexpected in view of the maximum sizes that it is known to obtain today using controlled radical polymerization or micellar radical polymerization methods in the absence of control agents.

Under the conditions of step (E), it proves possible to control the number-average molar mass of the polymers which makes it possible, inter alia, to produce polymers having low masses.

According to one advantageous embodiment, the associative polymer present in the fracturing fluid of the invention is synthesized according to the aforementioned step (E) and has a mass of between 50 000 and 10 000 000, preferably of between 750 000 and 5 000 000 g/mol, in particular between 1 000 000 and 4 000 000 g/mol. Typically, such polymers may be used at a concentration below their critical overlap concentration. On account of their small sizes, such polymers can diffuse at the interfaces and participate in modifying the properties of these interfaces or surfaces.

Irrespective of its nature, the associative polymer of the fracturing fluids according to the invention is typically present in an amount of 0.1% to 3%, preferably between 0.2% and 1.5%, preferably between 0.3% and 1% by weight relative to the total weight of the fracturing fluid.

The Labile Surfactants:

The labile surfactants used within the context of the invention are surfactants which have groups that have an affinity for the hydrophobic groups present on the associative polymers and moreover for the hydrophilic chains. Advantageously, they are water-soluble surfactants.

Furthermore, they are compounds bearing a cleavable function. This cleavable function is advantageously an ester function.

According to one embodiment, the labile surfactants present in the fracturing fluids of the invention are non-ionic surfactants. They may also be surfactants that have the structure of non-ionic surfactants, but that optionally bear a functionalized, optionally charged, group at the chain end.

According to one advantageous variant, these labile surfactants comprise ethoxylated fatty acid esters, typically corresponding to the formula R—COO—(CH$_2$—CH$_2$—O—)$_n$—H, where R is a linear or branched, preferably linear, hydrocarbon chain, typically an alkyl comprising from 4 to 22 carbon atoms, for example 5 to 18 carbon atoms.

One surfactant well-suited to the invention is for example Alkamuls PSML20 (also referred to as Polysorbate 20), of the following formula:

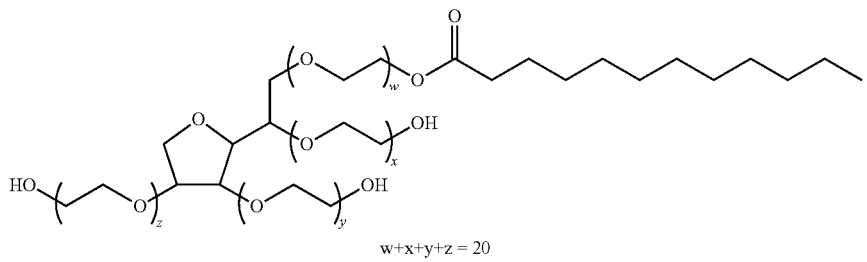

w+x+y+z = 20

This compound is available from Solvay.

Other Compounds Optionally Present in the Fracturing Fluid of the Invention:

pH Control Agent(s)

In particular when the labile surfactants are esters, the fracturing fluid may comprise agents for regulating or controlling the pH, especially buffers, bases or acids. As a function of the desired viscosity change profile, a pH range close to neutrality (between 6 and 8, more preferably between 6.5 and 7.5) will preferably be used if it is desired for the viscosity to increase slowly. Conversely, acid conditions (for example below 4, or below 3) or basic conditions (above 9, or above 10) will be used if a faster increase in the viscosity is desired.

Breakers

According to one advantageous embodiment, the composition injected may also comprise one or more amphiphilic compounds referred to as "breakers", which are suitable for lowering the viscosity in the fractured zones, after the fracturing has been carried out.

These breakers are typically non-labile surfactants introduced into the formulation in an encapsulated form. Use may in particular be made of surfactants in the form of granules that are coated with a protective wax film, typically by fluidized-bed coating.

When the fracturing fluid contains surfactants of breaker type in encapsulated form, these generally have no effect until the end of the fracturing operation (they are simply transported by the fracturing fluid, and their encapsulation renders them chemically inert at the start). After stopping the pressurized injection of the fracturing fluid, the capsules are found in the fractures, where they are subjected to the pressure of the fracture which tends to close up and they are "crushed", very particularly when proppants are present. This induces a release of the surfactants, which then become suitable for interacting with the associative polymers in order to decrease the viscosity. The presence of such breakers thus makes it possible to rid the fractures of the gelled composition that they contain following the fracturing (thus, the increase in viscosity (formation of a gel) only takes place temporarily during the fracturing, namely between the lysis of the labile surfactant and the release of the non-labile surfactant, which makes it possible to further minimize the pumping energy). Another advantage is that this makes it possible to reduce the time before the well is brought in.

The invention will now be illustrated by the example below.

EXAMPLE

Synthesis of an Associative Polymer (Poly Acrylamide/AMPS/LMA 2 000 000 g/Mol)

29.3 g of a 30% SDS solution, 89.03 g of distilled water and 1.66 g of lauryl methacrylamide (LMA monomer) were introduced into a 500 ml round-bottomed flask at room temperature (20° C.). The mixture was stirred using a magnetic stirrer bar for 6 hours, until a clear micellar solution was obtained.

32.9 g of the micellar solution thus prepared, 7.53 g of water, 40.7 g of acrylamide (aqueous solution at 50% by weight), 32 g of AMPS (aqueous solution at 51% by weight), 0.454 g of Rhodixan A1 (ethanol solution at 1.0% by weight) and 6.00 g of ammonium persulfate (aqueous solution at 0.67% by weight) were introduced into a 250 ml round-bottomed flask at room temperature (20° C.). The mixture was degassed by sparging with nitrogen for 20 minutes. 1.5 g of sodium formaldehyde sulfoxylate, in the form of an aqueous solution at 0.13% by weight, were added to the medium, in a single portion. The mixture was degassed by sparging with nitrogen for 15 minutes.

The polymerization reaction was then left to proceed with stirring for 16 hours at room temperature (20° C.).

Reduction in the Viscosity by Addition of Labile Surfactant

The polymer prepared above was placed in solution at 0.5% by weight of polymer in an aqueous solution of NaCl at 15% by weight in the presence of Alkamuls PSML20 labile surfactant at various concentrations.

For each of the concentrations, the viscosity of the mixture was measured at 80° C., using an AR2000 rheometer (TA Instruments, Surrey, Great Britain), equipped with a Couette-type geometry. The results are reported in the table below:

| concentration (ppm) | viscosity at 1 s$^{-1}$ (mPa · s) |
|---|---|
| 0 | 3430 |
| 50 | 1140 |
| 100 | 360 |
| 250 | 168 |
| 500 | 48 |
| 1000 | 10 |

The reduction in viscosity by addition of labile surfactant is demonstrated here above 500 ppm.

Hydrolysis of the Labile Surfactant—Effect on the Viscosity

The polymer from example 1 was placed in solution at 0.5 wt % in 15% NaCl in the presence of 0.5% Alkamuls PSML20. Sodium hydroxide is added in order to obtain a concentration of 83 mmol/l. The viscosity of the solution thus obtained is 10 cP at 25° C. (at 1 s$^{-1}$).

The solution was placed in an oven at 80° C. for 16 h. At the end of this treatment, the viscosity of the solution was measured as equal to 4200 cP at 1 s$^{-1}$ (versus 3600 cP for a polymer solution without surfactant obtained after hydration by heating for 4 h at 80° C.).

The invention claimed is:

1. A process for recovery of hydrocarbons in a hydrocarbon reservoir, comprising a step where a fracturing fluid comprising, in an aqueous medium:

an associative polymer suitable for increasing the viscosity of the aqueous medium; and a labile surfactant, wherein the labile surfactant comprises an ethoxylated fatty acid ester, in an amount sufficient to reduce or inhibit the effect of increasing the viscosity induced by said associative polymer; is injected into a hydrocarbon reservoir where the temperature and/or pH conditions are suitable for lyzing all or some of the labile surfactant;

wherein the associative polymer is made by micellar radical polymerization in which the following are placed in contact, in an aqueous medium:

hydrophilic monomers, dissolved or dispersed in said aqueous medium;

hydrophobic monomers, in the form of a micellar solution that comprises micelles of such hydrophobic monomers dispersed in the aqueous medium;

at least one radical polymerization initiator; and at least one radical polymerization control agent.

2. The process according to claim 1, wherein the labile surfactant comprises an ethoxylated fatty acid ester of formula R—COO—(CH$_2$—CH$_2$—O—)$_n$—H, where R is a linear or branched hydrocarbon chain.

3. The process according to claim 1, wherein the associative polymer is present in an amount of 0.1% to 3% by weight relative to the total weight of the fracturing fluid.

4. The process according to claim 1, wherein the micelles further comprise at least one surfactant.

5. The process according to claim 1, wherein the initiator comprises a water-soluble or water-dispersible initiator.

6. The process according to claim 1, wherein the radical polymerization control agent comprises a thiocarbonylthio group.

7. The process according to claim 6, wherein the radical polymerization control agent is a xanthate compound.

* * * * *